July 23, 1963 A. HUET 3,098,468
LIGHT BOILER FOR USE IN A NUCLEAR ENERGY INSTALLATION
Filed Nov. 12, 1957
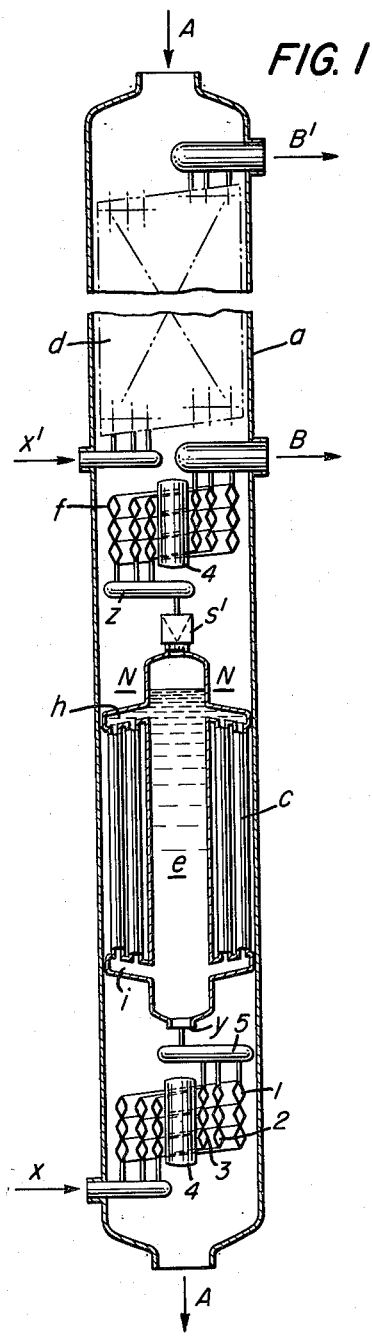
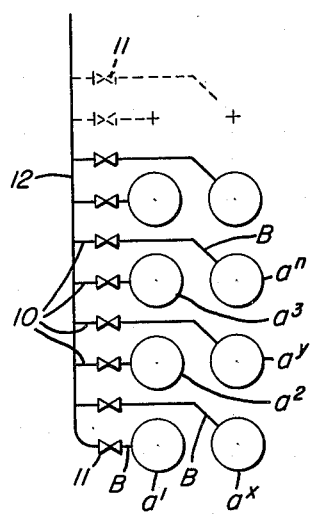
INVENTOR.
ANDRÉ HUET
BY
ATTORNEY

United States Patent Office 3,098,468
Patented July 23, 1963

3,098,468
LIGHT BOILER FOR USE IN A NUCLEAR ENERGY INSTALLATION
André Huet, 48 Ave. du President Wilson, Paris 16, France
Filed Nov. 12, 1957, Ser. No. 695,851
Claims priority, application France Nov. 30, 1956
12 Claims. (Cl. 122—32)

This invention consists of a light boiler specially designed for nuclear energy installations, and incorporating the following special features;

(1) The main casing, through which pass the gases leaving the reactor, is of limited diameter, in order to make it possible to join together a large number of light boilers (each of them individually separable) constituting the steam power unit recovering the heat supplied by the reactor.

(2) Each boiler comprises a central water tank occupying the entire height of the boiler proper; on to this tank are branched sub-headers grouping the water-tubes, which radiate out from the central water tank. The latter may be widened out in the vicinity of the water level in order to facilitate the release of steam.

(3) The economizer and (where applicable) the superheater, consist of coils whose axis of symmetry is the axis of the main casing. These coils comprise several circuits, fed in parallel, and are preferably composed of tubes of different diameters, with the external coils having diameters and tube surfaces greater than those nearer the axis of symmetry. The coils may be made up of tubes of appropriate sections, the space between two neighboring coils (i.e. the space through which the gases pass) varying, if necessary, along with the sections of the tubes of the different rows of coils. The water (or steam) and the heating fluid circulate in opposite directions.

The following details of construction, in conjunction with the attached drawing showing a typical embodiment, give a clear idea of how the invention may be applied in practice.

FIG. 1 shows the light boiler in question in vertical section; and

FIG. 2 is a diagrammatic representation of the combination of light boilers forming the installation as a whole.

In FIG. 1, the main casing $a$ of the light boiler is very appreciably reduced, so as to constitute a unit which, in case of accident or other untoward occurrence, may be easily withdraw from the steam generating unit as a whole. Units such as $a$ may be combined together in considerable numbers: $a^1$, $a^2$ . . . $a^n$, as shown diagrammatically in FIG. 2; each of them supplies steam through the transmission system 10, provided with a check-valve 11, to the steam manifold 12 of the installation. The dimensions adopted for each boiler element $a$ are such that one or more of them may be temporarily withdrawn from the assembly, without any interruption in the working of the installation.

Each main casing $a$ may be provided with one, two or three boilers working at different pressures. In the embodiment shown, two such boilers are represented: a high-pressure boiler at the top (diagrammatically represented at $d$, between the water inlet $x^1$ and the steam outlet $B^1$) and a low-pressure boiler at the bottom. This latter boiler is identical with the former, and a detailed description of it will be given.

The hot fluid passing through the main casing $a$ arrives at the top, in the direction of the arrows A, and leaves at the bottom. Each boiler comprises an economizer, water-tubes, and superheater.

The arrangement adopted for the boiler unit or evaporator proper is such that along the axis of the main casing $a$ there is a water tank $e$ extending the entire height of the boiler unit or evaporator, itself. This tank may widen out in the region of the water level in order to facilitate the release of steam. On the sides of the $e$ are branched two sub-header rims $h$ and $i$, to which are connected the water-tubes $c$, arranged in the direction of flow A and radiating out from the axis of symmetry so as to fill, in a balanced and homogeneous manner, the space through which the fluid A passes.

The economizer, represented at the bottom, is made up of circuits of coiled tubes. Three circuits, 1, 2, 3, are provided and fed in parallel. The tubes are of elongated section, expanded at their lateral walls so that the passage left for the hot fluid between two coils may be of variable section. The coils are of different diameters according to their distance from the main axis; i.e., the tubes of the external circuit 1 have a greater surface than those of the intermediate circuit 2, which in turn have a greater surface than those of circuit 3, which are the nearest to the central axis.

A baffle or flow diverter 4 is fitted in the axis of the arrangement so as to compel the the hot fluid A to pass over circuits 1, 2, and 3. The pitch of the spirals defined by circuits 1, 2, and 3 may differ.

The superheater $f$ is designed in a similar manner, as shown in FIG. 1.

The water arriving at $x$ feeds in parallel the three circuits 1, 2, and 3, after which, collected in the header 5, it passes through $y$ to the lower extremity of the tank $e$. Inside this tank, the water level, N—N for example, establishes itself slightly above the sub-headers $h$, so that the steam produced is already practically dry, before passing into the steam and water separator $s^1$ and from there via the pipe $z$ to the superheater $f$, from which the superheated steam leaves in the direction of the arrow B.

Of course, modifications in detail may be made to this invention without affecting its scope.

What I claim is:

1. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, means providing a plurality of heat-exchange surfaces for providing indirect heat exchange between said water and the evolved water vapor and said fluid, said water-feed means communicating with the lower portion of said means providing said heat-exchange surfaces, and vapor-outlet means for removing generated water vapor from the upper portion of said means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, said means providing said plurality of heat-exchange surfaces comprising a first tubular coil having the same axis as the casing, a light boiler comprising a central cylindrical water tank and radially-spaced parallel water tubes disposed around said tank and in fluid-communicating relationship therewith, and a second tubular coil having the same axis as the casing, said first tubular coil, said tank and said second tubular coil being directly interconnected for the flow of said water therethrough seriatim as it is converted into water vapor, said water-feed means being connected to an inlet end of said first coil and said vapor-outlet means being connected to an outlet end of said second coil.

2. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, a plurality of axially-aligned heat-exchange units each comprising means providing a plurality of heat-exchange surfaces for providing indirect heat exchange between said water and the evolved water vapor and said fluid, said water-feed means communicating with the lower portion of each of said units providing said heat-exchange surfaces, and vapor-outlet means for removing generated water vapor from the upper portion of each means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, each of said means providing said plurality of heat-exchange surfaces comprising a first tubular coil having the same axis as the casing, a light boiler comprising a central cylindrical water tank and radially-spaced parallel water tubes disposed around said tank and in fluid-communicating relationship therewith, and a second tubular coil having the same axis as the casing, said first tubular coil, said tank and said second tubular coil being directly interconnected for the flow of said water therethrough seriatim as it is converted into water vapor, said water-feed means being connected to an inlet end of said first coil and said vapor-outlet means being connected to an outlet end of said second coil.

3. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, a plurality of axially-aligned heat-exchange units each comprising means providing a plurality of heat-exchange surfaces for providing indirect heat exchange between said water and the evolved water vapor and said fluid, said water-feed means communicating with the lower portion of each of said units providing said heat-exchange surfaces, and vapor-outlet means for removing generated water vapor from the upper portion of each means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, each of said means providing said plurality of heat exchange surfaces comprising a plurality of first concentric coils of tubes of varying surface areas, a light boiler comprising a central cylindrical water tank and radially-spaced parallel water tubes disposed around said tank and in fluid-communicating relationship therewith, a plurality of second concentric coils of tubes of varying surface areas, said first coils, said tank and said second coils being directly interconnected for the flow of said water therethrough seriatim as it is converted into water vapor, said water-feed means being connected to an inlet end of said first coils and said vapor outlet means being connected to an outlet end of said second coils.

4. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, means providing a plurality of heat-exchange surfaces for providing indirect heat exchange between said water and the evolved water vapor and said fluid, said water-feed means communicating with the lower portion of said means providing said heat-exchange surfaces, and vapor-outlet means for removing generated water vapor from the upper portion of said means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, said means providing said plurality of heat-exchange surfaces comprising a first tubular coil having the same axis as the casing, a light boiler comprising a central cylindrical water tank and radially-spaced parallel rectilinear water tubes disposed around said tank and in fluid-communicating relationship therewith, and a second tubular coil having the same axis as the casing, said first tubular coil, said tank and said second tubular coil being directly interconnected for the flow of said water therethrough seriatim as it is converted into water vapor, said water-feed means being connected to an inlet end of said first coil and said vapor-outlet means being connected to an outlet end of said second coil, each of said first and second coils being formed from a plurality of coil elements fed in parallel and disposed concentrically about the axis of said casing with the coil elements further removed from said axis having a greater diameter than the coil elements nearer said axis.

5. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, a plurality of axially-aligned heat-exchange units including an economizer, a steam-generating evaporator, and a superheater, and each comprising means providing a plurality of heat-exchange surfaces for providing indirect heat exchange between said water and the evolved water vapor and said fluid, said economizer and said superheater each comprising a plurality of coils having axes common with the axis of said casing, the coils further removed from said axis having a greater diameter than the coils nearer said axis, and said evaporator including longitudinally-extending rectilinear tubes, said water-feed means communicating with the lower portion of each of said units providing said heat-exchange surfaces, and vapor-outlet means for removing generated water vapor from the upper portion of each means providing said heat-exchange surfaces, and said economizer, said evaporator, and said superheater being interconnected for seriatim passage of said water therethrough as it is converted to water vapor, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit.

6. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, a plurality of axially-aligned heat-exchange units each comprising means providing a plurality of heat-exchange surfaces for providing indirect heat exchange between said water and the evolved water vapor and said fluid, said water-feed means communicating with the lower portion of each of said units providing said heat-exchange surfaces, and vapor-outlet means for removing generated water vapor from the upper portion of each means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, each of said means providing said plurality of heat-exchange surfaces comprising a first tubular coil having the same axis as the casing, a light boiler comprising a central cylindrical water tank and radially-spaced parallel rectilinear water tubes disposed around said tank and in fluid-communicating relationship therewith, and a second tubular coil having the same axis as the casing, said first tubular coil, said tank and said second tubular coil being directly interconnected for the flow of said water therethrough seriatim as it is converted into water vapor, said water-feed means being connected to an inlet end of said first coil and said vapor-outlet means being connected to an outlet end of said second coil, each of said first and second coils being formed from a plurality of coil elements fed in parallel and disposed concentrically about the axis of said casing with the coil elements further removed from said axis having a greater diameter than the coil elements nearer said axis.

7. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, a plurality of axially-aligned heat-exchange units each comprising means providing a plurality of heat-exchange surfaces for providing indirect heat exchange between said water and the evolved water vapor and said fluid, said water-feed means communicating with the lower portion of each of said units providing said heat-exchange surfaces, and vapor-outlet means for removing generated water vapor from the upper portion of each means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, each of said means providing said plurality of heat exchange surfaces comprising a plurality of first concentric coils of tubes of varying surface areas disposed around the axis of said casing, a light boiler comprising a central cylindrical water tank and radially-spaced parallel water tubes disposed around said tank and in fluid-communicating relationship therewith, a plurality of second concentric coils of tubes of varying surface areas disposed around the axis of said casing, said first coils, said tank and said second coils being directly interconnected for the flow of said water therethrough seriatim as it is converted into water vapor, said water-feed means being connected to an inlet end of said first coils and said vapor outlet means being connected to an outlet end of said second coils, each of said concentric coils being of a different diameter and being disposed at different radial distances from each other.

8. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, means providing a plurality of heat-exchange surfaces including an economizer, a steam-generating evaporator, and a superheater for providing indirect heat exchange between said water and the evolved water vapor and said fluid, said economizer and said superheater each comprising a plurality of coils having axes common with the axis of said casing, the coils further removed from said axis having a greater diameter than the coils nearer said axis, and said evaporator including longitudinally-extending rectilinear tubes, said water-feed means communicating with the lower portion of said means providing said heat-exchange surfaces, and vapor-outlet means for removing generated water vapor from the upper portion of said means providing said heat-exchange surfaces, and said economizer, said evaporator, and said superheater being interconnected for seriatim passage of said water therethrough as it is converted to water vapor, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, the coils of said economizer and said superheater comprising tubes having a cross section with a larger dimension longitudinally of the casing containing them than the transverse dimension perpendicular to the axis of said casing.

9. An installation for the generation of steam by recovering the heat from a fluid issuing from a nuclear reactor comprising, in combination, a large plurality of assembled identical casings in the form of elongated columns having an axial dimension substantially greater than the transverse diameter, each identical casing being provided with water-feed means, means providing a plurality of heat-exchange surfaces for providing indirect heat exchange between said water and the evolved water vapor and said fluid, said water-feed means communicating with the lower portion of said means providing said heat-exchange surfaces, and vapor-outlet means for removing generated water vapor from the upper portion of said means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, said means providing said plurality of heat-exchange surfaces comprising a first tubular coil having the same axis as the casing, a light boiler comprising a central cylindrical water tank and radially-spaced parallel rectilinear water tubes disposed around said tank and in fluid-communicating relationship therewith, and a second tubular coil having the same axis as the casing, said first tubular coil, said tank and said second tubular coil being directly interconnected for the flow of said water therethrough seriatim as it is converted into water vapor, said water-feed means being connected to an inlet end of said first coil and said vapor-outlet means being connected to an outlet end of said second coil, each of said first and second coils being formed from a plurality of coil elements fed in parallel and disposed concentrically about the axis of said casing with the coil elements further removed from said axis having a greater diameter than the coil elements nearer said axis, the coils of said economizer and said superheater comprising tubes having a cross section with a larger dimension longitudinally of the casing containing them than the transverse dimension perpendicular to the axis of said casing.

10. An installation for the generation of steam by recovering the heat from a fluid issuing from a nuclear reactor comprising, in combination, a large plurality of assembled identical casings in the form of elongated colums having an axial dimension substantially greater than the transverse diameter, each identical casing being provided with water-feed means, a plurality of axially-aligned heat-exchange units each comprising means providing a plurality of heat-exchange surfaces for providing indirect heat exchange between said water and the evolved water vapor and said fluid, said water-feed means communicating with the lower portion of each of said units providing said heat-exchange surfaces, and vapor-outlet means for removing generated water vapor from the upper portion of each means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit, each of said means providing said plurality of heat exchange surfaces comprising a plurality of first concentric coils of tubes of varying surface areas disposed around the axis of said casing, a light boiler comprising a central cylindrical water tank and radially-spaced parallel water tubes disposed around said tank and in fluid-communicating relationship therewith, a plurality of second concentric coils of tubes of varying surface areas disposed around the axis of said casing, said first coils, said tank and said second coils being directly interconnected for the flow of said water therethrough seriatim as it is converted into water vapor, said water-feed means being connected to an inlet end of said first coils and said vapor outlet means being connected to an outlet end of said second coils, each of said concentric coils being of a different diameter and being disposed at different radial distances from each other, the coils of said economizer and said superheater comprising tubes having a cross section with a larger dimension longitudinally of the casing containing them than the transverse dimension perpendicular to the axis of said casing.

11. An installation for the generation of steam by recovering the heat from a fluid issuing from a nuclear reactor comprising, in combination, a large plurality of assembled identical casings in the form of elongated colums having an axial dimension substantially greater than the transverse diameter, each identical casing being provided with water-feed means, means providing a plurality of heat-exchange surfaces including an economizer, a steam-generating evaporator, and a superheater for providing indirect heat exchange between said water and the evolved water vapor and said fluid, said economizer and said superheater each comprising a plurality of coils having axes common with the axis of said casing, the coils further removed from said axis having a greater diameter than the coils nearer said axis, and said steam-generating evaporator comprising a plurality of rectilinear, axially-extending tubes, said water-feed means communicating with the lower portion of said means providing said heat-exchange surfaces, and vapor-outlet means for removing generated water vapor from the upper portion of said means providing said heat-exchange surfaces, and said economizer, said evaporator, and said superheater being interconnected for seriatim passage of said water therethrough as it is converted to water vapor, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit.

12. An installation for the generation of steam by recovering the heat from a fluid issuing from a nuclear reactor comprising, in combination, a large plurality of assembled identical casings in the form of elongated colums having an axial dimension substantially greater than the transverse diameter, each identical casing being provided with water-feed means, a plurality of axially-aligned heat-exchange units including an economizer, a steam-generating evaporator, and a superheater and each comprising means providing a plurality of heat-exchange surfaces for providing indirect heat exchange between said water and the evolved water vapor and said fluid, said economizer and said superheater each comprising a plurality of coils having axes common with the axis of said casing, the coils further removed from said axis having a greater diameter than the coils nearer said axis, and said steam-generating evaporator comprising a plurality of rectilinear, axially-extending tubes, said water-feed means communicating with the lower portion of each of said units providing said heat-exchange surfaces, and vapor-outlet means for removing generated water vapor from the upper portion of each means providing said heat-exchange surfaces, each of said casings being provided with feed means for the introduction of said fluid from the nuclear reactor and being provided with outlet means for removal of said fluid after it has passed through the casing in indirect heat exchange with said water, a common effluent conduit adjacent said casings and means for conducting the water vapor issuing from said vapor-outlet means into said common conduit, whereby said water vapor is removed from the installation through said conduit.

References Cited in the file of this patent

UNITED STATES PATENTS

| 1,422,521 | Averitt | July 11, 1922 |
| 1,469,805 | Musselman | Oct. 9, 1923 |
| 1,803,081 | Uhle et al. | Apr. 28, 1931 |
| 2,547,589 | Marshall | Apr. 3, 1951 |
| 2,702,026 | Dalin | Feb. 15, 1955 |
| 2,796,050 | Rehm | June 18, 1957 |

FOREIGN PATENTS

| 13,960 | Great Britain | A. D. 1891 |
| 190,946 | Great Britain | Jan. 4, 1923 |
| 1,054,671 | France | Oct. 7, 1953 |

OTHER REFERENCES

Proceedings of the International Conference on the Peaceful Uses of Atomic Energy, vol. III, article by Simpson et al.; held in Geneva, Aug. 8–20, 1955; pages 211 and 212.